United States Patent Office 3,200,493
Patented Aug. 17, 1965

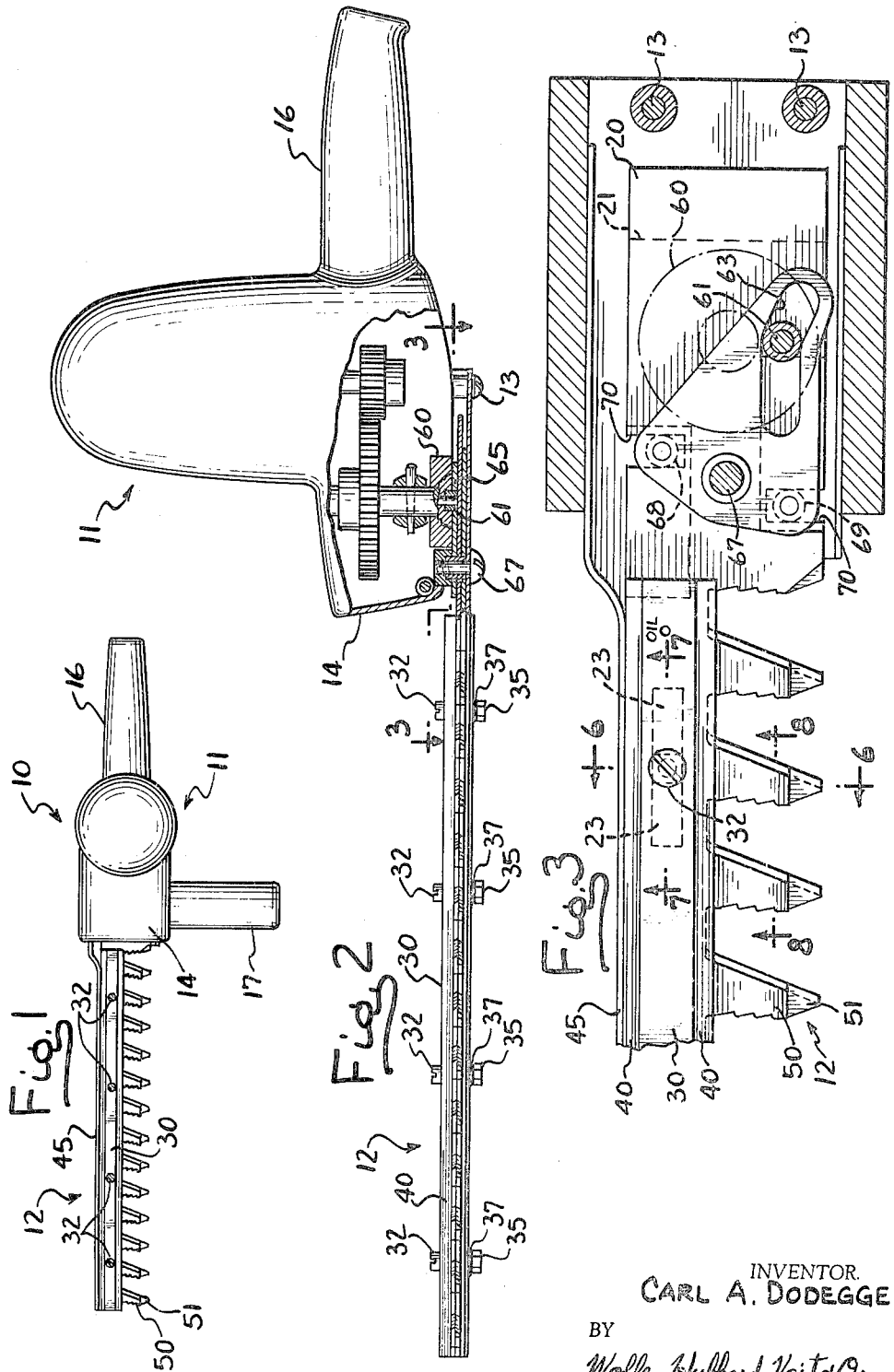

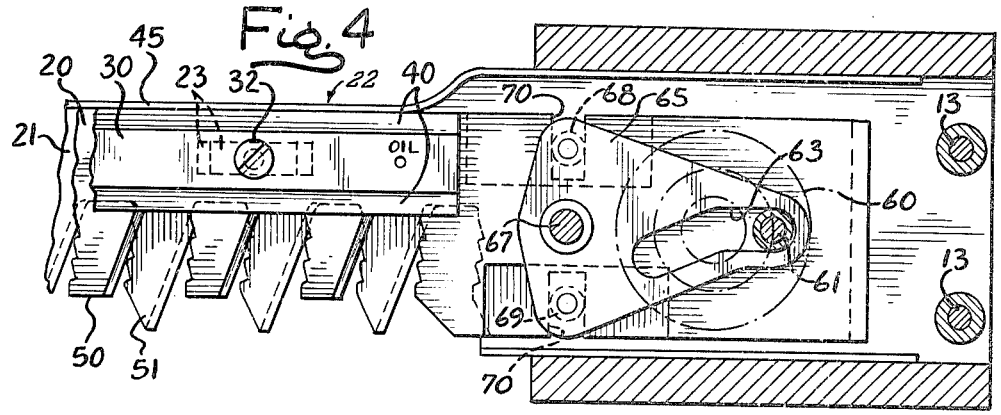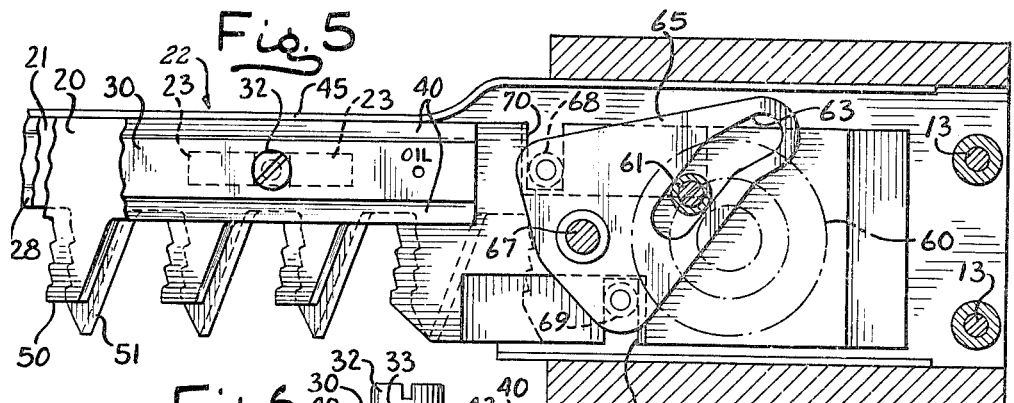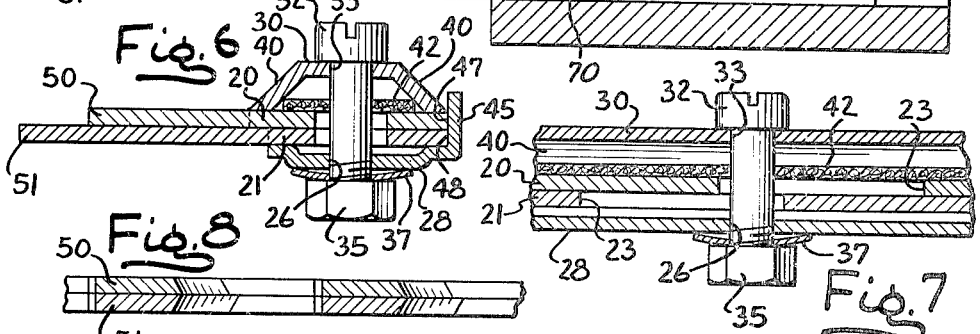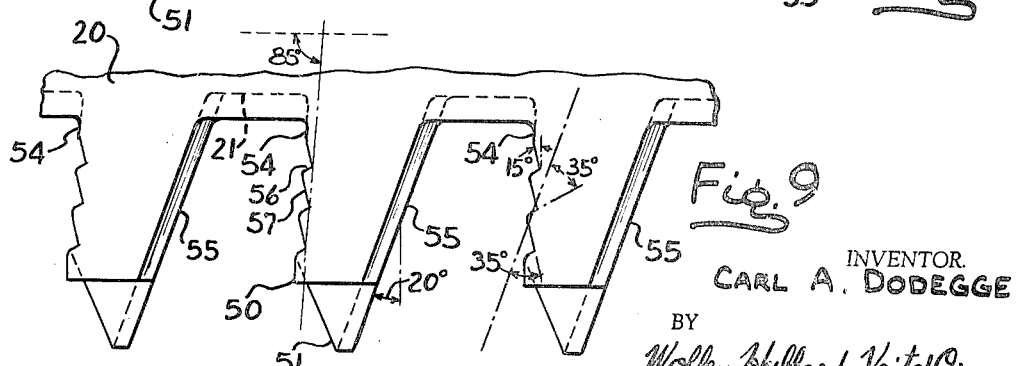
INVENTOR.
CARL A. DODEGGE
BY
Wolfe, Hubbard, Voit & Osann
ATTYS.

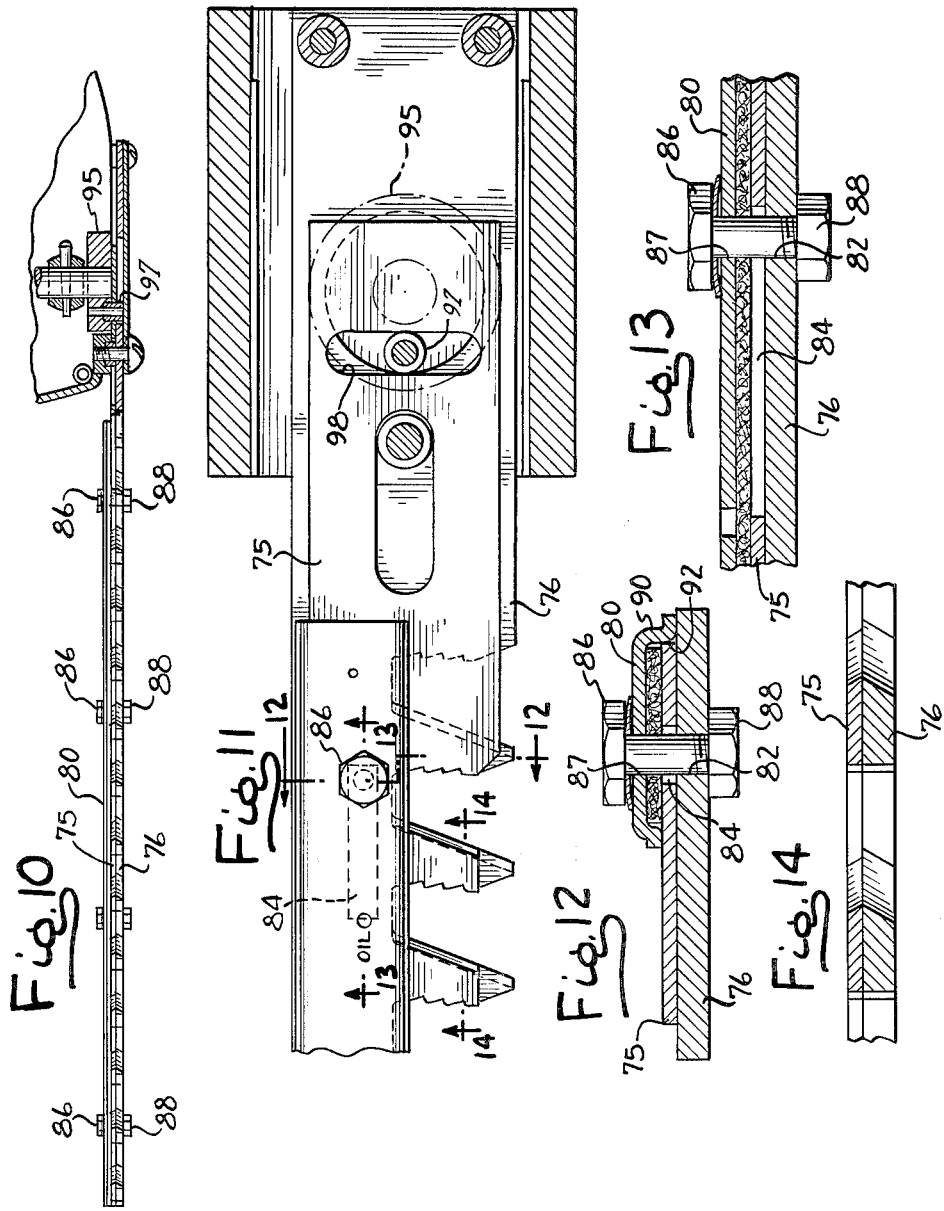

3,200,493
HEDGE TRIMMER
Carl A. Dodegge, Maywood, Ill., assignor to Aero Metal Products Corporation, Chicago, Ill., a corporation of Illinois
Filed Mar. 1, 1963, Ser. No. 261,968
6 Claims. (Cl. 30—216)

This application relates to improvements in powered portable hedge trimmers and the like.

It is an object of the present invention to provide an improved hedge trimmer which is double acting for faster operation. It is a related object to provide such a trimmer which has an improved cutting action, requiring less power to operate.

It is another object of the invention to provide a hedge trimmer with cutting edges disposed for optimum efficiency, and with the further advantage of serving to guide twigs and branches into the cutting area as well as inhibiting escape of such branches and twigs from the cutting area and holding such against the shearing action of relatively movable blades.

Still another object of the invention is to provide a hedge trimmer which is less subject to frictional wear by virtue of improved lubrication, while at the same time being constructed for particular ease in service and repair, being easily assembled and disassembled and sharpened by hand without recourse to special equipment or tools.

These and other objects and advantages of the invention will become more apparent from a reading of the following detailed description in conjunction with the appended drawings, wherein:

FIGURE 1 is a top plan view of a hedge trimmer embodying one form of the present invention;

FIG. 2 is an enlarged side elevational view of the hedge trimmer of FIG. 1 with fragments of the housing broken away to show a portion of the drive arrangement;

FIG. 3 is an enlarged partial sectional view illustrating the blades and drive connection for the FIG. 1 embodiment of the invention;

FIGS. 4 and 5, like FIG. 3, are enlarged partial sectional views illustrating the blades and drive connection in various operative positions showing reciprocal action of the blades;

FIG. 6 is a sectional view of the blades and cutter bar taken along the line 6—6 of FIG. 3;

FIG. 7 is a sectional view of a portion of the device taken along line 7—7 of FIG. 3;

FIG. 8 is a sectional view taken along the line 8—8 of FIG. 3;

FIG. 9 is an enlarged view of the teeth of the blades illustrating certain angular relationships;

FIG. 10 is a fragmentary side elevational view, partially in section, showing a modified embodiment of the present invention;

FIG. 11 is an enlarged fragmentary top plan view with portions in section illustrating a portion of the FIG. 10 embodiment of the invention;

FIG. 12 is a sectional view taken along line 12—12 of FIG. 11;

FIG. 13 is a sectional view taken along line 13—13 of FIG. 11; and

FIG. 14 is a sectional view taken along lines 14—14 of FIG. 11.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Turning now, in particular, to the drawings, a power driven, portable hedge trimmer embodying the present invention is illustrated at 10 in FIG. 1 and comprises, generally, a power drive assembly, indicated at 11, for driving a cutter section 12, which is attached thereto by any suitable means, such as screws 13.

The power drive assembly 11 is shown in FIG. 2, where a portion of the casing 14 is cut away to show elements of the transmission drive connection with the cutter blade assembly. The casing 14 is conveniently formed with a handle 16 projecting rearwardly therefrom. A second handle 17 is also provided, fitted to the side of the casing in any convenient manner, thus affording means for gripping the trimmer for pulling it through the hedge to be trimmed.

The present invention, in one of its aspects, contemplates the provision of an improved cutter section, and this is illustrated with particularity in FIGS. 6, 7, and 9. Referring first to FIGS. 6 and 7, the cutter assembly comprises a pair of elongated longitudinally reciprocable cutter blades 20, 21 disposed in face-to-face relation and supported on a fixed guide bar 22. In keeping with the present form of the invention, the guide bar 22 is composed of an elongated bar member 28 and an elongated hold-down clamp 30 arranged spaced from and parallel to said bar member with said blades in between. Each of the blades is provided with elongated slots 23 aligned with holes 26 in the guide bar member 28. The bar member 28 and hold-down clamp 30 are held in assembled relation, straddling the blades by appropriate fasteners, such as screws 32, which are passed through holes 33 in the hold-down clamp, through the slots 23 in the cutter blades, and through the holes 26 in the guide bar member 28, with a nut 35 threaded on the end of each screw to hold the assembly together in proper position. Lock washers 37 are also provided to prevent inadvertent loosening of the nuts 35 during operation.

In order that the cutter blades may be reciprocated without danger of misalignment, it is advantageous to provide a guide for the blades. This is efficiently accomplished by the provision of a laterally projecting straight flange 45 extending from one side of the guide bar member 28 parallel with the bar axis. The cutter blades 20, 21 have straight back edges which ride in bearing relation on the guide flange 45 when the cutter blades are operating; thus, as the cutter blades reciprocate, the pressure of twigs and branches against the blades holds the latter against the guide bar flange 45.

It will be appreciated that, as the blades are reciprocated, considerable friction occurs between the opposed faces of the blades and between the latter and the guide bar and clamp. The present invention contemplates efficient means of supplying adquate lubrication between the rubbing surfaces to minimize friction and wear. Thus, the elongated clamp 30 is formed with inturned flanges 40 which bear directly against the blade 20. By virtue of this construction, friction is reduced because of the relatively small effective bearing area, while a small chamber is formed within the confines of the hold-down clamp and the cutter blade 20 when the two are in operative position. A strip of cotton waste material 42, or like substance, may be conveniently used in this space so that lubricating oil may be retained therein. In order to further facilitate lubrication of the cutter blades in operation, the adjacent face-to-face surfaces of the cutter blades 21 are hollow-ground to provide a slight concavity, thereby forming a small lubricating chamber between the two. The guide bar 28 is also channeled to provide clearance with the adjacent blade 21, and this space may, if desired, also receive a strip of absorbant material (not shown). The slots 23 in the blades provide passages for the oil to reach the lubricating chambers from oil holes at spaced points along the bar.

As indicated particularly in FIGS. 3, 4, 5, and 9, each of the cutter blades 20, 21 is formed with forwardly slanted cutter teeth, cutter blade 20 having teeth 50, while cutter blade 21 has teeth 51. In accomplishing the present invention, the teeth 50, 51 are so constructed as to provide a double cutting action during reciprocation of the cutter blades 20, 21 relative to one another. Thus, both the leading and trailing edges 54, 55, respectively, of each tooth on a cutting blade are spaced for shearing action with an edge of an adjacent tooth on the other cutting blade upon relative reciprocative movement.

It will be seen, in looking at FIG. 9, that the trailing edge 55 of each tooth is sharpened and that the edge is straight, thereby permitting it to be hand sharpened without the use of special tools. The leading edge 54, on the other hand, is irregular, and provided with a saw-tooth configuration. By so constructing the leading edge, which is disposed at an angle of approximately 85 degrees from the axis of reciprocation, shrubs and the like which come into the spaces between cutting teeth will be held by the saw-toothed edge against the trailing edge of an adjacent tooth, and will be cut as the teeth edges pass one another during reciprocation of the blades 20, 21. In carrying out this feature, each tooth is specially constructed to provide a positive cutting action and, with reference to FIG. 9, it will be seen that certain angular relationships are set out to demonstrate the preferred tooth construction. Thus, it will be seen that straight trailing edges 55 define an angle of approximately 70 degrees with the axis of reciprocation of the blades 15 degrees less than that (85 degrees) of the saw-toothed leading edges 54. An angular relationship, such as that shown, results in a scissor-type action as the leading and trailing edges of adjacent teeth pass one another during the cutting. This scissor action causes a reaction force on the blades when an object is being cut, which urges the blades firmly against the guide so as to permit the guide to function as intended.

A further feature is found in the saw-toothed portions formed on the leading edge 54. The edge comprises a number of relatively short downwardly facing edges 56 between longer, outwardly facing edges 57. The edges 56, 57 are formed at an angle with respect to an associated trailing edge 55 so as to permit their functioning as cutting edges. In the present instance, the edges form an angle of 35 degrees with the edge 55, but this may be varied within a range which would provide a good cutting action. Also, while the angle between edge 55 and edges 56, 57 is the same, to provide a more balanced cutting force, these angles may vary within the limits mentioned when so desired. Additionally, the downwardly facing edges 56 tend to hold twigs and the like in the root area of the teeth for cutting, thus increasing the effectiveness of the trimmer.

Further in keeping with this aspect of the invention, the teeth 51 on one of the blades are longer than the teeth 50 on the other blade; thus, an outer portion of the tooth 51 does not serve in a cutting capacity, but it does serve to engage twigs and guide them into the cutting area.

With particular reference to FIGS. 3, 4, and 5, the cutting action of the cutter section 12 will become more clear. It will be seen, for instance, that the blades are reciprocated relative to one another a sufficient distance so that cutting or shearing of shrubbery, or the like, between the teeth will take place on both the forward and rearward strokes.

As a further aspect of this embodiment of the invention, a novel drive arrangement is provided, as illustrated in FIGS. 3, 4, and 5, for reciprocating both bars 20, 21 on the guide bar. Thus, the motor and transmission assembly illustrated in FIG. 2 drives a crank 60 having a crankpin 61 disposed on a radius thereof. The crankpin operates in a slot 63 of a drive cam 65 which is mounted rotatably on a reaction pin 67. The drive cam 65, though somewhat irregular in shape, is essentially triangular with the slot 63 running from the apex thereof along one side. Near the opposite corners thereof, a pair of drive pins 68, 69 are provided and are disposed approximately equidistant from the center of the reaction pin 67, about which the cam is rotatable. The pins 68, 69 are disposed in slots 70, 71, respectively, on cutter bars 20, 21. As the crank 60 is rotated by the live transmission in housing 14, the crankpin 61 reciprocates in slot 63. The slot 63 is formed with an angular offset portion which provides a few degrees of dwell when the blades are in the open position to permit sufficient time for twigs and shrubs to become positioned therebetween. As the pin 61 rides in slot 63, the cam 65 oscillates about the pin 67 and, in so doing, the drive pins 68, 69 traverse a relatively flat, somewhat arcuate path about the pin 67, which results in a reciprocation of the cutter blades 20, 21.

By reciprocating both bars, the distance one bar need be reciprocated is substantially reduced. By reducing the travel of the cutter bars, wear thereon is reduced, whereas speed of the device may be substantially increased, because the number of times that cutting surfaces of the respective blades will intersect is increased.

Certain advantages of the present invention previously described, with respect to the cutter assembly, may also be obtained, though only a single blade is reciprocated. Thus, in FIGS. 10–14 a form of the present invention is shown, wherein only one blade is reciprocated. In this embodiment, as shown in FIG. 12, a pair of cutter blades 75, 76 are carried for relative reciprocative movement along a guide bar 80. Since only one blade is reciprocable, that being, in this instance, the blade 75, one blade 76 is fixed to the casing. Holes 82 are formed in the blade 76 and are aligned with slots 84 in the movable blade 75. Bolts 86 are passed through holes 87 in the guide bar 80, the aligned holes 82 and slots 84 in the blades 76, 75, respectively, and fastened by a nut 88 to hold the assembly together.

In keeping with the invention, the guide bar 80 comprises a channel-shaped side member with a laterally projecting flange portion 90 at one end thereof. The end portion supports and guides the straight back edge 92 of the reciprocable blade 75. The channel-shaped side portion defines a lubricant reservoir with the reciprocable blade 75 which has access through the slots in the blade to the area between the reciprocable and stationary blade for lubricating this area. As previously mentioned, one or both of these rubbing surfaces may be hollow ground for reducing bearing area, as well as provided more uniform lubrication.

Turning to FIG. 11, blade 75 is driven by a crank 95 having a crankpin 97 on its diameter, which rides in a slot 98 in the cutter bar 75. As the crank 95 is rotated by the power drive, therefore, pin 97 is rotated and traverses the length of the slot 98, which results in the reciprocation of the bar 75 with respect to the blade 76. The teeth of the respective blades are formed in a manner identical to that previously described to provide the benefits of this novel tooth construction, as indicated.

I claim as my invention:

1. In a portable hedge trimmer, a housing enclosing a power unit, an elongated cutter assembly fixed to said housing, said cutter assembly comprising the combination of a guide bar having a side portion and a laterally projecting straight flange extending therefrom so as to lie parallel with the longitudinal axis thereof, a channel member rigidly fixed to said guide bar by longitudinally spaced bolts, an elongated cutter blade mounted for longitudinal reciprocable movement adjacent said one side of said bar and between the latter and said channel member, said channel member and the adjacent blade together defining a reservoir for lubrication, and said blade being provided with elongated slots for receiving said bolts and for providing channels for conveying lubrication to said blade, said blade having a straight edge bearing against said flange, said slots having clearance with said bolts so that the blade is guided by said flange without bearing against said bolts, said blade having spaced cutting teeth, extending transversely to the axis of reciprocation, each tooth having a leading and trailing edge, the leading edge being formed with angularly disposed edges defining a saw-toothed configuration, said trailing edge being relatively straight and sharpened, means presenting a series of like cutting teeth cooperable with the teeth on said blade so that as said blade is reciprocated relative to said means, a scissor action results between the leading and trailing edges of the teeth on said blade and said means, said scissor action urging said reciprocable blade against said flange, and drive means operated by said power unit, connected to reciprocate said blade.

2. In a portable hedge trimmer, a housing enclosing a power unit, an elogated cutter blade guide bar fixed to said housing, said guide bar having a side portion and a laterally projecting straight flange extending therefrom so as to lie parallel with the longitudinal axis thereof, a pair of elongated cutter blades disposed in face-to-face relation and mounted for longitudinal reciprocable movement in alternate forward and rearward directions adjacent said one side of said bar, and each having a straight edge adapted to bear against said flange for guiding said blades in their reciprocable movement, each said blade having spaced forwardly slanting cutting teeth adapted to cooperate with like teeth on the other blade to produce a cutting action when said blades are reciprocating, and drive means comprising a pivoted cam having an angular slot therein, transverse drive pins disposed about said pivot on said cam, vertical slots formed in each of said cutter blades, said drive pins being disposed in said vertical slots, and a crank rotated by said power unit and disposed in said angular slot whereby, when said crank is rotated, said cam oscillates about its pivot for relatively reciprocating said blades.

3. In a portable hedge trimmer, a housing enclosing a power unit, an elongated cutter blade guide bar fixed to said housing, said guide bar having a side portion and a laterally projecting straight flange extending therefrom so as to lie parallel with the longitudinal axis thereof, a pair of elongated cutter blades disposed in face-to-face relation and mounted for longitudinal reciprocable movement in alternate forward and rearward directions adjacent said one side of said bar, and each having a straight edge adapted to bear against said flange for guiding said blades in their reciprocable movement, each said blade having spaced forwardly slanting cutting teeth adapted to cooperate with like teeth on the other blade to produce a cutting action when said blades are reciprocating, the cutting teeth on one of said blades extending beyond the teeth on the other in a direction transverse to the axis of reciprocation for guiding twigs and the like into said hedge trimmer, and drive means operated by said power unit, connected to said cutter blades for reciprocating the same relative to one another.

4. In a portable hedge trimmer, a housing enclosing a power unit, an elongated cutter blade guide bar fixed to said housing, said guide bar having a side portion and a laterally projecting straight flange extending therefrom so as to lie parallel with the longitudinal axis thereof, a channel member rigidly fixed to said guide bar by longitudinally spaced bolts, a pair of elongated cutter blades disposed in face-to-face relation and mounted for longitudinal reciprocable movement adjacent said one side of said bar and between the latter and said channel member, said channel member and the adjacent blade together defining a reservoir for lubrication, each of said blades being provided with elongated slots for receiving said bolts and providing channels for conveying lubrication to between said blades, and each blade having a straight edge adapted to bear against said flange, said slots having clearance with said bolts so that said blades are guided by said flange without bearing against said bolts, each said blade having spaced cutting teeth extending transversely to the axis of reciprocation and adapted to cooperate with like teeth on the other blade to produce a cutting action when said blades are reciprocating, each tooth having a leading edge and a trailing edge, the leading edge being formed with angularly disposed edges defining a saw-toothed configuration, said trailing edge being relatively straight and sharpened, said angularly disposed edges of a tooth on one blade being adapted to cooperate with the sharpened trailing edge of an adjacent tooth on the other blade, so that as said blades are reciprocated relative to one another a scissor action results, and drive means operated by said power unit and connected to reciprocate said blades.

5. In a portable hedge trimmer, a housing enclosing a power unit, an elongated cutter assembly fixed to said housing, said cutter assembly comprising the combination of a guide bar having a channeled side portion and a laterally projecting straight flange extending therefrom so as to lie parallel with the longitudinal axis thereof, an elongated cutter blade mounted for longitudinal reciprocable movement adjacent said one side of said bar and having a straight edge bearing against said flange for guiding said blade in its reciprocable movement, said channel side portion and said elongated cutter blade together defining a reservoir for lubricating material for supplying lubrication to said blade during reciprocation thereof, a stationary blade opposite to said elongated cutter blade, one of said blades being hollow ground on the surface facing the other for permitting lubrication between the two, means connecting said reservoir and the surfaces between said blades for permitting flow of lubrication between the two, and drive means operated by said power unit and connected to reciprocate said elongated cutter blade.

6. In a portable hedge trimmer, a housing enclosing a power unit, an elongated cutter blade guide bar fixed to said housing, said guide bar having a side portion and a laterally projecting straight flange extending therefrom so as to lie parallel with the longitudinal axis thereof, a pair of elongated cutter blades disposed in face-to-face relation and mounted for longitudinal reciprocable movement adjacent said one side of said bar, a channel-shaped hold-down clamp opposite said one side of said bar and connected thereto so as to sandwich said cutter blades therebetween, said channeled clamp defining with an adjacent blade a reservoir for lubrication, one of said blades being hollow ground on the surface facing the other, said reservoir and said hollow ground surface being interconnected for providing lubrication between said reciprocable blades, and each having a straight edge adapted to bear against said flange for guiding said blades in their reciprocable movement, each said blade having spaced cutting teeth extending transversely to the axis of reciprocation and adapted to cooperate with like teeth on the other blade to produce a cutting action when said blades are reciprocating, and drive means operated by said power unit, connected to said cutter blades for reciprocating the same relative to one another.

References Cited by the Examiner

UNITED STATES PATENTS

| | | | |
|---|---|---|---|
| 173,851 | 2/76 | Freeman | 30—223 X |
| 421,024 | 2/90 | Bechtol et al. | 30—221 X |
| 1,083,072 | 12/13 | Ferbrache | 30—224 X |
| 1,816,868 | 8/31 | Privat | 56—304 X |
| 1,897,924 | 2/33 | Coleman et al. | 30—216 X |
| 2,633,636 | 4/53 | Szostek | 30—216 |
| 2,756,500 | 7/56 | Green | 30—224 X |
| 2,964,845 | 12/60 | Dooling | 30—216 |
| 3,083,457 | 4/63 | Ottosen et al. | 30—216 |

WILLIAM FELDMAN, *Primary Examiner.*